US012160046B1

(12) United States Patent
Lalezari et al.

(10) Patent No.: US 12,160,046 B1
(45) **Date of Patent: *Dec. 3, 2024**

(54) ANTENNA ELEMENT AND ARRAYS THEREOF

(71) Applicant: FIRST RF Corporation, Boulder, CO (US)

(72) Inventors: Farzin Lalezari, Boulder, CO (US); Arian C. Lalezari, Boulder, CO (US); Michael R. Markey, Broomfield, CO (US); Michael R. Goulder, Longmont, CO (US)

(73) Assignee: FIRST RF Corporation, Boulder, CO (US)

(*) Notice: Subject to any disclaimer, the term of this patent is extended or adjusted under 35 U.S.C. 154(b) by 287 days.

This patent is subject to a terminal disclaimer.

(21) Appl. No.: 17/902,143

(22) Filed: Sep. 2, 2022

Related U.S. Application Data

(63) Continuation-in-part of application No. 16/366,081, filed on Mar. 27, 2019, now Pat. No. 11,437,716.

(51) Int. Cl.
*H01Q 21/29* (2006.01)
*H01Q 21/00* (2006.01)

(52) U.S. Cl.
CPC ......... *H01Q 21/29* (2013.01); *H01Q 21/0037* (2013.01)

(58) Field of Classification Search
CPC ...... H01Q 21/29; H01Q 21/0037; H01Q 1/48; H01Q 9/0421; H01Q 9/38; H01Q 9/28; H01Q 21/26; H01Q 9/32
See application file for complete search history.

(56) References Cited

U.S. PATENT DOCUMENTS

| | | | | |
|---|---|---|---|---|
| 9,257,748 B1* | 2/2016 | Lalezari | .................... | H01Q 5/50 |
| 11,437,716 B1* | 9/2022 | Lalezari | ............... | H01Q 9/0421 |
| 2005/0195124 A1 | 9/2005 | Puente Baliarda et al. | | |
| 2007/0069964 A1* | 3/2007 | Hoshiai | ................ | H01Q 1/1271 343/700 MS |

(Continued)

OTHER PUBLICATIONS

Sengupta et al. Rudimentary horn antenna, IEEE Transactions on Antennas and Propagation, vol. 19, No. 1, Jan. 1971, pp. 124-126.

(Continued)

*Primary Examiner* — Hai V Tran
*Assistant Examiner* — Michael M Bouizza
(74) *Attorney, Agent, or Firm* — COZEN O'CONNOR

(57) ABSTRACT

An antenna system includes a plurality of antenna elements arranged in an array having a plurality of array elements. Each antenna element has a radiator extending from a radiator feed end to a radiator terminal end, where a first straight-line distance from the radiator feed end to the radiator terminal end is less than λ/4, λ being a longest wavelength of a bandwidth of the antenna element. Each antenna element also includes a counterpoise extending from a counterpoise feed end to a counterpoise terminal end, where a second straight-line distance from the counterpoise feed end to the counterpoise terminal end is less than λ/4. The counterpoise feed end is spaced apart from the radiator feed end. The radiator and the counterpoise diverge at an acute angle from an area encompassing the radiator feed end and the counterpoise feed end.

20 Claims, 14 Drawing Sheets

(56) References Cited

U.S. PATENT DOCUMENTS

| | | | |
|---|---|---|---|
| 2009/0322631 A1 | 12/2009 | Huchard et al. |
| 2010/0265146 A1 | 10/2010 | Montgomery et al. |
| 2011/0001677 A1 | 1/2011 | Strnad |
| 2017/0352945 A1 | 12/2017 | Chang et al. |
| 2018/0366816 A1 | 12/2018 | Jan et al. |
| 2019/0260127 A1 | 8/2019 | Shi |

OTHER PUBLICATIONS

King el al., Transmission-Line Missile Antennas, IRE Transactions on Antennas and Propagation, vol. 8, No. 1, Jan. 1960, pp. 88-90.
Chen et al., Broadband planar inverted-L antennas, IEE Proc.—Microw. Antennas Propag., vol. 148. No. 5, Oct. 2001, pp. 339-342.

* cited by examiner

ANTENNA ELEMENT AND ARRAYS THEREOF

RELATED APPLICATIONS

This application is a continuation-in-part of U.S. patent application Ser. No. 16/366,081, filed on Mar. 27, 2019, the entirety of which is incorporated herein by reference.

BACKGROUND

A significant problem in the field of antennas is the generation of a horizontally polarized signal in close proximity to a conductive surface. One approach to realizing such a signal is to use a bent monopole. With reference to FIG. 1, a bent monopole 20 comprises a radiator 22 and a ground plane 24. The radiator 22 is frequently depicted as having a first portion 26 that extends vertically away from the ground plane and a second portion 28 that is connected to the end of the first portion and extends substantially parallel to the ground plane. For convenience, such a bent monopole will be referred to as a flagpole monopole. The feed element for the flagpole monopole establishes electrical connections to the radiator and the ground plane. Due to the vertically extending first portion, the flagpole monopole produces a significant vertically polarized signal, which reduces any horizontally polarized signal that the antenna is capable of producing. To reduce the vertically polarized signal, a bent monopole is utilized that essentially eliminates the vertical portion of the flagpole bent monopole and begins to curve towards the second portion substantially adjacent to the ground plane. Such a monopole can be visualized as bent fishing rod. As such, this type of bent monopole will be referred to hereinafter as the fishing rod monopole or the rod monopole. With reference to FIG. 2, a rod monopole 30 includes a curved radiator 32 and a ground plane 34. While reducing the vertically polarized signal, the rod monopole still has significant vertical polarization at the high end of the frequency operating band. In addition, the horizontal polarization component present at the high end of the frequency band is in close proximity to the ground plane and, as such, this reduces the efficiency of the horizontal, high-frequency radiation produced by the monopole.

SUMMARY

The invention recognizes that flagpole and rod bent monopoles each exhibit changing polarization with frequency. More specifically, these monopoles exhibit an increasingly vertically polarized signal component with increasing frequency and, necessarily, a decreasingly horizontally polarized signal component with increasing frequency. In many situations, a more consistent horizontally polarized signal component is needed, i.e., a horizontally polarized signal component that is greater at higher frequencies than is attainable by either the flagpole or rod monopoles. The invention addresses this issue by realizing an antenna element for use in producing a more consistently polarized signal over frequency. Further, the horizontally polarized signal radiation efficiency is improved at the high end of the frequency band relative to flagpole and rod monopoles. In addition, the invention achieves lower first frequency of operation and greater overall impedance bandwidth.

Generally, the antenna element is constrained so that the components of the antenna element are located between first and second imaginary planes that are parallel to one another and spaced from one another by no more than $\lambda_l/2$, where $\lambda_l$ is the wavelength at the low end of the bandwidth of the antenna element. The first imaginary plane is representative of the location of at least a portion of a conductive surface adjacent to which the antenna element is to be positioned when in use. The antenna element includes a radiator and a counterpoise that are both positioned between the first and second imaginary planes. Further, the counterpoise is positioned in the space that extends from the first imaginary plane up to but not including the radiator. As such, when element is in actual use, the counterpoise can be either electrically connected to whatever conductive surface is located at the first imaginary plane or electrically isolated therefrom. Associated with each of the radiator and the counterpoise is a feed location for receiving a feed line (e.g., coaxial cable) that is used to transmit signals to and/or receive signals from the antenna element. For example, the outer conductor of a coaxial cable may be connected to the counterpoise and the inner conductor of the coaxial cable may be connected to the radiator. Both the radiator feed location and the counterpoise feed location are closer to the second imaginary plane than to the first imaginary plane. Generally, the radiator feed location and the counterpoise feed location can be combined to define a feed area or volume that does not include any significant portion of either the radiator or the counterpoise. An imaginary plane that is perpendicular to the imaginary ground plane and passes through the feed area or volume defines a radiator-counterpoise cross section. Characteristic of the radiator-counterpoise cross-section is that the cross section of the radiator and the cross section of the counterpoise diverge from one another as these cross sections extend away from the feed area or volume.

In another embodiment, a pair of antenna elements whose horizontal polarization axes of radiation as projected onto the imaginary ground plane are aligned and whose feed areas or volumes are adjacent to one another such that no portion of any radiator is located between the feed areas are utilized to provide the capability of producing a predominantly horizontally polarized signal on the same polarization axes of radiation, a predominantly vertically polarized signal, or any polarization in between these two extremes. These various horizontally and vertically polarized signals are achieved by weighting the signals at each of the two antenna elements with particular amplitudes and phases. For example, a predominantly horizontally polarized signal would use equal amplitudes and 180° phase difference between the signals applied to the two antenna elements. In contrast, a predominantly vertically polarized would be achieved by applying signals of equal amplitude and with a 0° phase difference to the two antenna elements. A signal with vertical and horizontal components would be obtained by the application of unequal amplitudes and/or unequal phase differences to the two antenna elements.

In another embodiment, a pair of antenna elements whose horizontal polarization axes of radiation, as projected onto the imaginary ground plane, are not aligned and whose feed areas or volumes are adjacent to one another such that no portion of any radiator is located between the feed areas are utilized to provide the capability of producing a horizontally polarized signal whose axis can be moved between those two horizontal polarization axes.

Yet a further embodiment includes two pairs of antenna elements with one pair of antenna elements having their horizontal polarization axes of radiation, as projected onto the imaginary ground plane, aligned to define a first horizontal polarization axis, the other pair of antenna elements having their horizontal polarization axes of radiation, as projected onto the imaginary ground plane, aligned to define a second horizontal polarization axis, and the first and second horizontal polarization axes being perpendicular to one another. This embodiment allows any combination of horizontal and vertical polarization and the resulting horizontal polarization axis can be rotated to any desired location in the plane defined by the first and second horizontal polarization axes.

DETAILED DESCRIPTION

An antenna element is provided that provides a more consistent horizontally polarized signal than is provide by flagpole and rod monopoles. As such, the antenna element also provides a more consistent vertically polarized signal. Further, the horizontally polarized signal provided by the antenna element has improved efficiency with increasing frequency relative to flagpole and rod monopoles.

Figure 1:
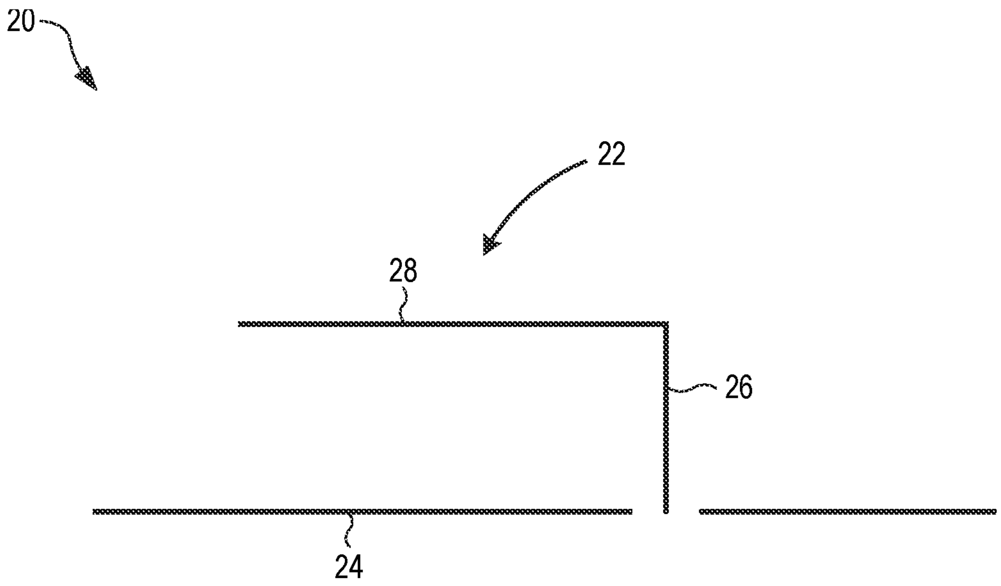
FIG. 1 (PRIOR ART)
FIG. 1 illustrates a first type of bent monopole, sometimes referred to as a flagpole monopole.
Figure 2:
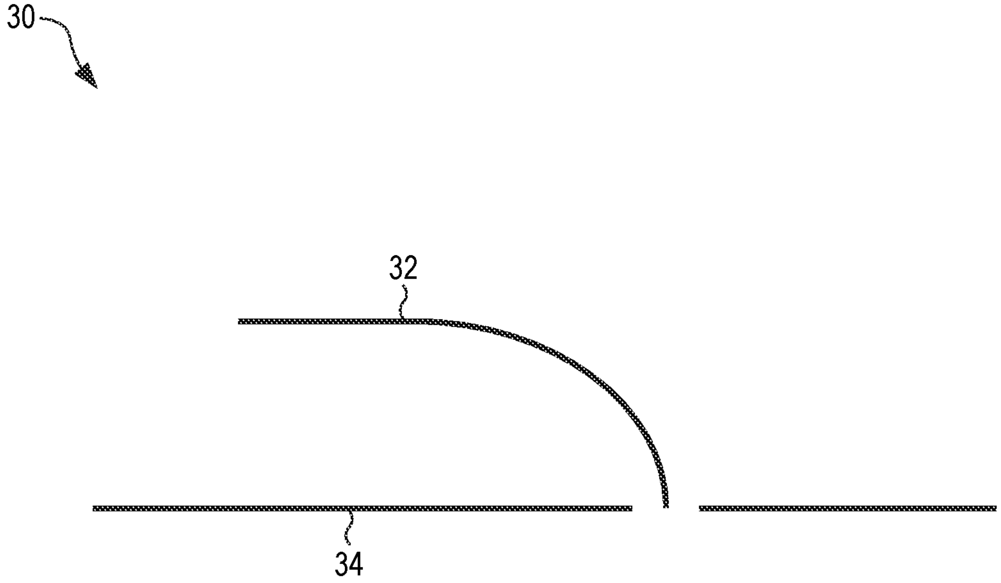
FIG. 2 (PRIOR ART)
FIG. 2 illustrates a second type of bent monopole, sometimes referred to as a "fishing rod" or rod monopole.
Figure 3:
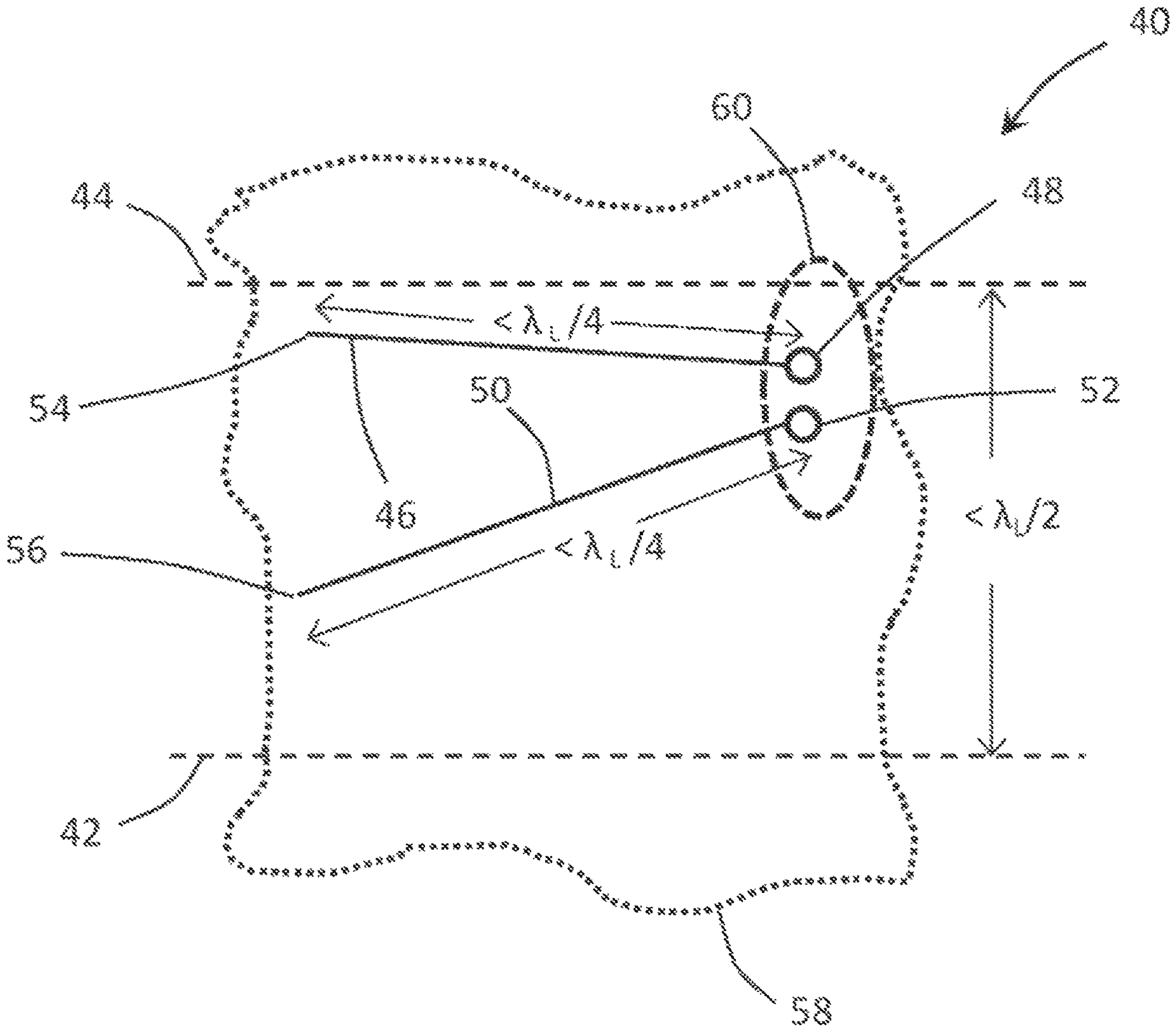
FIG. 3 illustrates a wire embodiment of an antenna element for use in producing a more consistent horizontally polarized signal.

With reference to FIG. 3, a wire embodiment of an antenna element 40 (hereinafter "element 40") is described. At the outset, the element 40 exists within an envelope that is defined by an imaginary ground plane 42 and an imaginary boundary plane 44 that is spaced from and parallel to the imaginary ground plane 42. The imaginary ground plane 42 and the imaginary boundary plane 44 are spaced from one another by less than $\lambda_I/2$, wherein $\lambda_I$ is the wavelength at the low end of the bandwidth of the antenna element (i.e., the longest wavelength at which the antenna element operates). The element 40 includes a radiator 46 with a radiator feed location 48 and a counterpoise 50 with a counterpoise feed location 52. It should be appreciated that the imaginary ground plane 42 represents the location that at least a portion of an actual ground plane will be situated with respect to the radiator 46 and counterpoise 50 in an operational situation. The radiator 46 extends from the radiator feed location 48 to a terminal end 54. The straight-line distance between the radiator feed location 48 and the terminal end 54 is less than $\lambda_I/4$. In a particular embodiment, the radiator 46 is parallel to or lies within the imaginary boundary plane 44. The counterpoise 50 is located in a space that extends from the imaginary ground plane 42 up to but not including the radiator 46. The counterpoise 50 extends from the counterpoise feed location 52 to a terminal end 56. The straight-line distance between the counterpoise feed location 52 and the terminal end 56 is less than $\lambda_I/4$. The radiator feed location 48 and the counterpoise feed location 52 can be no more than $\lambda_I/4$ apart but typically will be separated by no more than $0.05\lambda_I$. Further, the radiator feed location 48 and the counterpoise feed location 52 are closer to the imaginary boundary plane 44 than to the imaginary ground plane 42. In many situations, the radiator feed location 48 and the counterpoise feed location 52 are located within $0.1\lambda_I$ of the imaginary boundary plane 44. In a particular embodiment, the radiator feed location 48 is intersected by the imaginary boundary plane 44. An imaginary plane 58 that is perpendicular to the imaginary ground plane 42 and passes through at least one of the radiator feed location 48 and the counterpoise feed location 52 defines a radiator-counterpoise cross section that, in this case, is shown by the radiator 46 and the counterpoise 50. In this cross section, the cross section of the radiator (which for a wire embodiment is represented by the radiator 46) and the cross section of the counterpoise (which for a wire embodiment is represent by the counterpoise 50) diverge from a location 60 that encompasses the radiator feed location 48 and the counterpoise feed location 52. In certain applications, the counterpoise 50 is located so as to have an angle relative to the imaginary ground plane 42 in the range of 30°-90°. Other applications or situations may require or dictate a different angular relationship. Associated with the element 40 is an axis of horizontal polarization radiation, i.e., when in operation, the polarization of the radiated signal can be decomposed into horizontally polarized and vertically polarized components, the horizontally polarized component being parallel to the imaginary ground plane 42 and the vertically polarized component being perpendicular to the imaginary ground 42.

Figure 4:
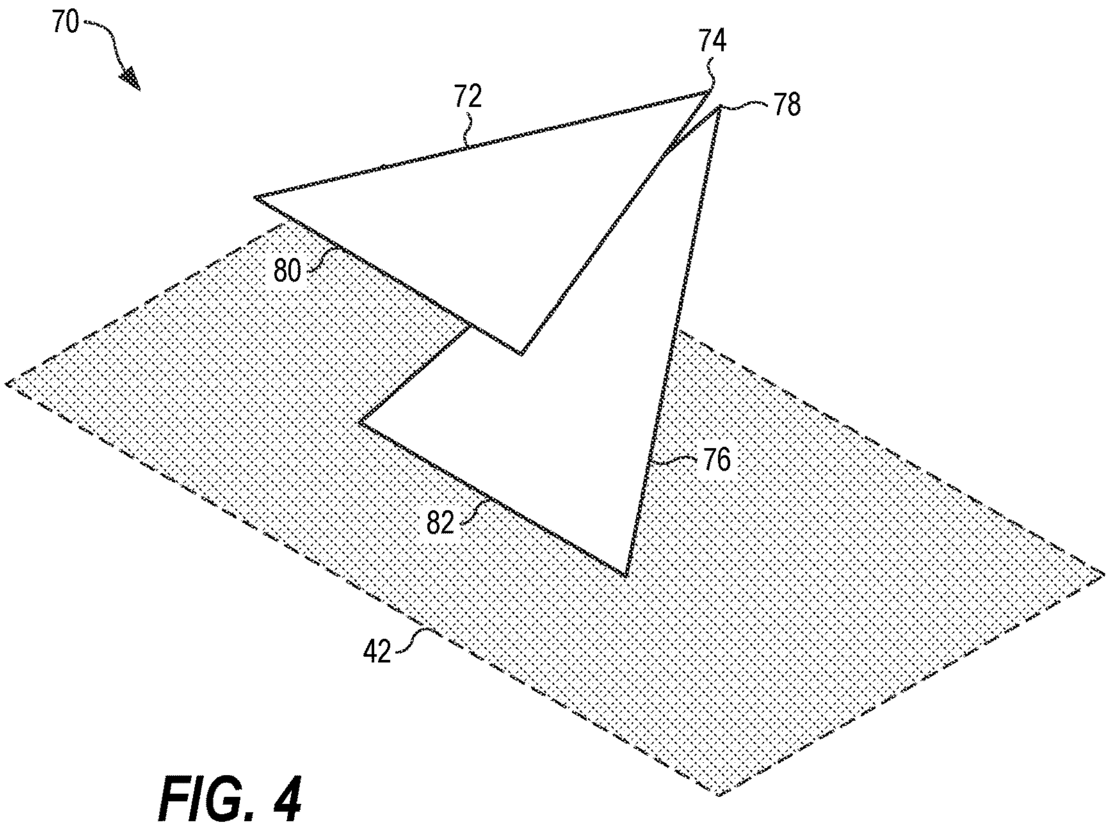
FIG. 4 is a perspective view of a second embodiment of an antenna element for use in producing a more consistent horizontally polarized signal that employs a planar radiator and a planar counterpoise.

With reference to FIG. 4, a second embodiment of an antenna element 70 (hereinafter "element 70") is described. The element 70 includes a planar radiator 72 with a radiator feed location 74 and a planar counterpoise 76 with a counterpoise feed location 78. The element 70 has at least one cross section defined by a plane that is perpendicular to the imaginary ground plane 42 and passes through a location that corresponds to location 60 (element 40) and encompasses the radiator feed location 74 and the counterpoise feed location 78 (such as the imaginary plane 58 in FIG. 3) that satisfies the constraints noted with respect to element 40. More specifically, (a) the cross section of the radiator 72 extends from the radiator feed location 74 to whatever terminal end is defined by the cross section (some point along edge 80) and has a straight-line length of less than $\lambda_T/4$, (b) the cross section of the counterpoise 76 extends from the counterpoise feed location 78 to whatever terminal end is defined by the cross-section (some point along edge 82) and has a straight-line length of less than $\lambda_T/4$, (c) the cross section of the counterpoise 76 is located in a space that extends from the imaginary ground plane 42 up to but not including the cross section of the radiator 72, (d) the radiator feed location 74 and the counterpoise feed location 78 can be no more than a $\lambda_T/4$ apart, (e) the radiator feed location 74 and the counterpoise feed location 78 are each located closer to the imaginary boundary plane 44 than to the imaginary ground plane 42, and (f) the cross section of the radiator 72 and the cross section of the counterpoise 76 diverge from a location that corresponds to location 60 in FIG. 3 and encompasses the radiator feed location 74 and the counterpoise feed location 78. Associated with the element 70 is an axis of horizontal polarization radiation, i.e., when in operation, the polarization of the radiated signal can be decomposed into horizontally polarized and vertically polarized component, the horizontally polarized component being parallel to the imaginary ground plane 42 and the vertically polarized component being perpendicular to the imaginary ground 42. In certain embodiments, the radiator 72 is parallel to or lies within the imaginary boundary plane 44, the separation of the radiator feed location 74 and the counterpoise feed location 78 is no more than $0.05\lambda_T$, the radiator feed location 74 and the counterpoise feed location 78 are located within $0.1\lambda_T$ of the imaginary boundary plane 44, the radiator feed location 74 is intersected by the imaginary boundary plane 44, and the cross-section of the counterpoise 76 is located so as to have an angle relative to the imaginary ground plane 42 in the range of 30°-90°.

Figure 5:
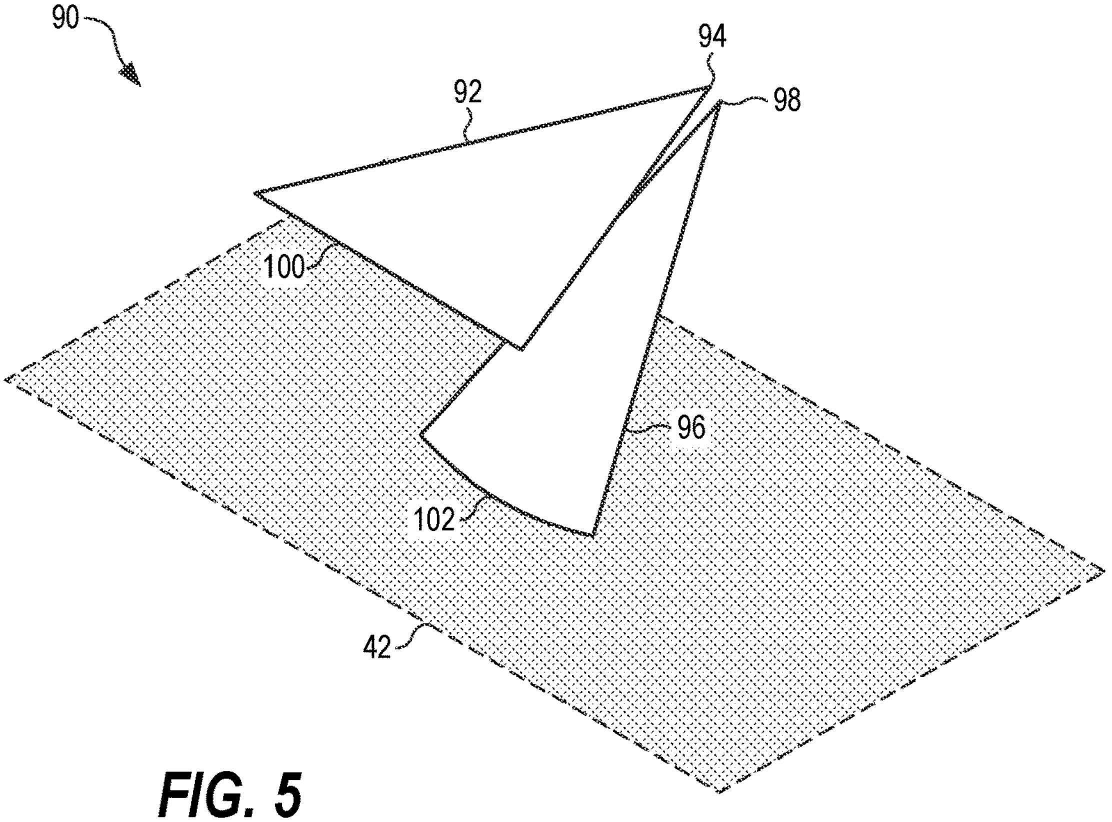
FIG. 5 is a perspective view of a third embodiment of an antenna element for use in producing a more consistent horizontally polarized signal that employs a planar radiator and a partially conic counterpoise.

With reference to FIG. 5, a third embodiment of an antenna element 90 (hereinafter "element 90") is described. The element 90 includes a planar radiator 92 with a radiator feed location 94 and a partially conic counterpoise 96 with a counterpoise feed location 98. The element 90 has at least one cross section defined by a plane that is perpendicular to the imaginary ground plane 42 and passes through a location that corresponds to location 60 (element 40) and encompasses the radiator feed location 94 and the counterpoise feed location 98 (such as the imaginary plane 58 in FIG. 3) that satisfies the constraints noted with respect to element 40. More specifically, (a) the cross section of the radiator 92 extends from the radiator feed location 94 to whatever terminal end is defined by the cross section (some point along a radiator distal edge 100) and has a straight-line length of less than $\lambda_T/4$, (b) the cross section of the counterpoise 96 extends from the counterpoise feed location 98 to whatever terminal end is defined by the cross section (some point along a counterpoise distal edge 102) and has a straight-line length of less than $\lambda_T/4$, (c) the cross section of the counterpoise 96 is located in a space that extends from the imaginary ground plane 42 up to but not including the cross section of the radiator 92, (d) the radiator feed location 94 and the counterpoise feed location 98 can be no more than $\lambda_T/4$ apart, (e) the radiator feed location 94 and the counterpoise feed location 98 are each located closer to the imaginary boundary plane 44 than to the imaginary ground plane, and (f) the cross section of the radiator 92 and the cross section of the counterpoise 96 diverge from a location that that corresponds to location 60 in FIG. 3 and encompasses the radiator feed location 94 and the counterpoise feed location 98. Associated with the element 90 is an axis of horizontal polarization radiation, i.e., when in operation, the polarization of the radiated signal can be decomposed into horizontally polarized and vertically polarized component, the horizontally polarized component being parallel to the imaginary ground plane 42 and the vertically polarized component being perpendicular to the imaginary ground 42. In certain embodiments, the radiator 92 is parallel to or lies within the imaginary boundary plane 44, the separation of the radiator feed location 94 and the counterpoise feed location 98 is no more than $0.05\lambda_T$, the radiator feed location 94 and the counterpoise feed location 98 are located within $0.1\lambda_T$ of the imaginary boundary plane 44, the radiator feed location 94 is intersected by the imaginary boundary plane 44, and the cross section of the counterpoise 96 is located so as to have an angle relative to the imaginary ground plane 42 in the range of 30°-90°.

Figure 6:
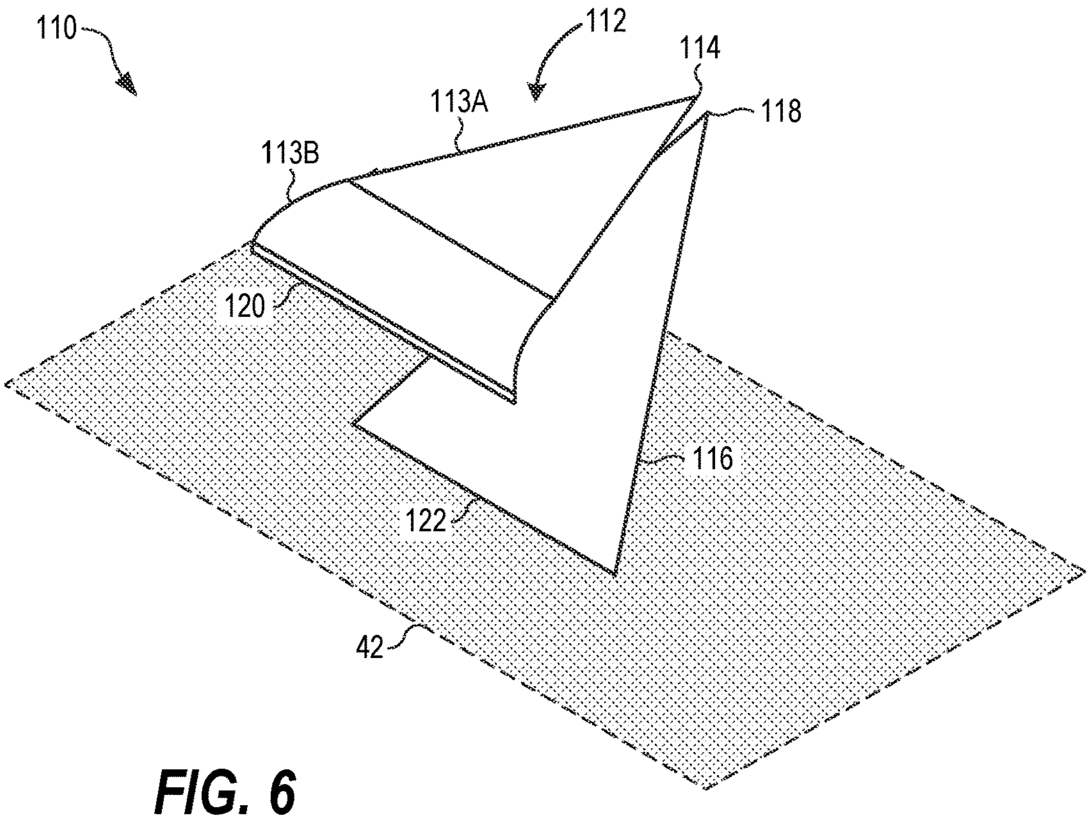
FIG. 6 is a perspective view of a fourth embodiment of an antenna element for use in producing a more consistent horizontally polarized signal that employs a planar counterpoise and a radiator that has a planar section and curved end-section which provides capacitive loading.

With reference to FIG. 6, a fourth embodiment of an antenna element 110 (hereinafter "element 110") is described. The element 110 includes a radiator 112 fed at a radiator feed location 114 and a planar counterpoise 116 fed at a counterpoise feed location 118. The radiator 112 is a composite radiator that include a planar section 113A and a curved section 113B that provides capacitive loading, which extends the low-end frequency performance of the element. The element 110 has at least one cross section defined by a plane that is perpendicular to the imaginary ground plane 42 and passes through a location that corresponds to location 60 (element 40) and encompasses the radiator feed location 114 and the counterpoise feed location 118 (such as the imaginary plane 58 in FIG. 3) that satisfies the constraints noted with respect to element 40. More specifically, (a) the cross section of the radiator 112 extends from the radiator feed location 114 to whatever terminal end is defined by the cross section (some point along a radiator distal edge 120) and has a straight-line length of less than $\lambda_T/4$, (b) the cross section of the counterpoise 116 extends from the counterpoise feed location 118 to whatever terminal end is defined by the cross section (some point along a distal counterpoise edge 122) and has a straight-line length of less than $\lambda_I/4$, (c) the cross section of the counterpoise 116 is located is located in a space that extends from the imaginary ground plane 42 up to but not including the cross section of the radiator 112, (d) the radiator feed location 114 and the counterpoise feed location 118 can be no more than a $\lambda_I/4$ apart, (e) the radiator feed location 114 and the counterpoise feed location 118 are each located closer to the imaginary boundary plane 44 than to the imaginary ground plane 42, and (f) the cross section of the radiator 112 and the cross section of the counterpoise 116 diverge from a location that corresponds to location 60 in FIG. 3 and encompasses the radiator feed location 114 and the counterpoise feed location 118. It should be appreciated that, while the cross section of the radiator and the cross section of the counterpoise converge in the region associated with curved section 113B, if a least squares best fit process is applied to the cross-section of the radiator, the resulting line diverges from the cross section of the counterpoise. Associated with the element 110 is an axis of horizontal polarization radiation, i.e., when in operation, the polarization of the radiated signal can be decomposed into horizontally polarized and vertically polarized component, the horizontally polarized component being parallel to the imaginary ground plane 42 and the vertically polarized component being perpendicular to the imaginary ground 42. In certain embodiments, the radiator 112 is parallel to or lies within the imaginary boundary plane 44, the separation of the radiator feed location 114 and the counterpoise feed location 116 is no more than $0.05\lambda_I$, the radiator feed location 114 and the counterpoise feed location 118 are located within $0.1\lambda_I$ of the imaginary boundary plane 44, the radiator feed location 114 is intersected by the imaginary boundary plane 44, and the cross-section of the counterpoise 116 is located to have an angle relative to the imaginary ground plane 42 in the range of 30°-90°.

Figure 7:
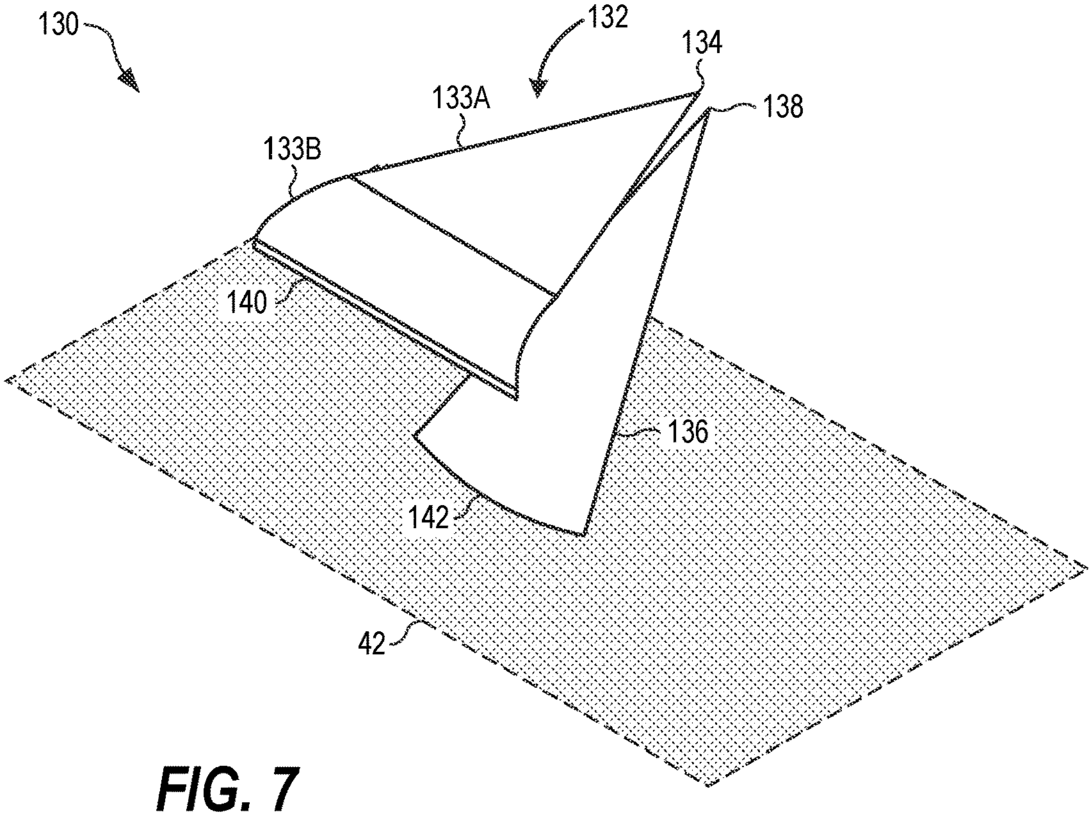
FIG. 7 is a perspective view of a fifth embodiment of an antenna element for use in producing a more consistent horizontally polarized signal that employs a partially conic counterpoise and a radiator that has a planar section and curved end-section that provides capacitive loading.

With reference to FIG. 7, a fifth embodiment of an antenna element 130 (hereinafter "element 130") is described. The element 130 includes a radiator 132 and a radiator feed location 134 and a partially conic counterpoise 136 with a counterpoise feed location 138. The radiator 132 is a composite radiator that include a planar section 133A and a curved section 133B that provides capacitive loading. The element 130 has at least one cross section defined by a plane that is perpendicular to the imaginary ground plane 42 and passes through a location that corresponds to location 60 (element 40) and encompasses the radiator feed location 134 and the counterpoise feed location 138 (such as the imaginary plane 58 in FIG. 3) that satisfies the constraints noted with respect to element 40. More specifically, (a) the cross section of the radiator 132 extends from the radiator feed location 134 to whatever terminal end is defined by the cross section (some point along 140) and has a straight-line length of less than $\lambda_I/4$, (b) the cross section of the counterpoise 136 extends from the counterpoise feed location 138 to whatever terminal end is defined by the cross section (some point along edge 142) and has a straight-line length of less than $\lambda_I/4$, (c) the cross section of the counterpoise 136 is located in a space that extends from the imaginary ground plane 42 up to but not including the cross section of the radiator 132, (d) the radiator feed location 134 and the counterpoise feed location 138 can be no more than a $\lambda_I/4$ apart, (e) the radiator feed location 134 and the counterpoise feed location 138 are each located closer to the imaginary boundary plane 44 than to the imaginary ground plane 42, and (f) the cross section of the radiator 132 and the cross section of the counterpoise 136 diverge from a location that corresponds to location 60 in FIG. 3 and encompasses the radiator feed location 134 and the counterpoise feed location 138. Associated with the element 130 is an axis of horizontal polarization radiation, i.e., when in operation, the polarization of the radiated signal can be decomposed into horizontally polarized and vertically polarized component, the horizontally polarized component being parallel to the imaginary ground plane 42 and the vertically polarized component being perpendicular to the imaginary ground 42. In certain embodiments, the radiator 132 is parallel to or lies within the imaginary boundary plane 44, the separation of the radiator feed location 134 and the counterpoise feed location 138 is no more than $0.05\lambda_I$, the radiator feed location 134 and the counterpoise feed location 138 are located within $0.1\lambda_I$ of the imaginary boundary plane 44, the radiator feed location 134 is intersected by the imaginary boundary plane 44, and the cross section of the counterpoise 136 is located to have an angle relative to the imaginary ground plane 42 in the range of 30°-90°.

Figure 8A:
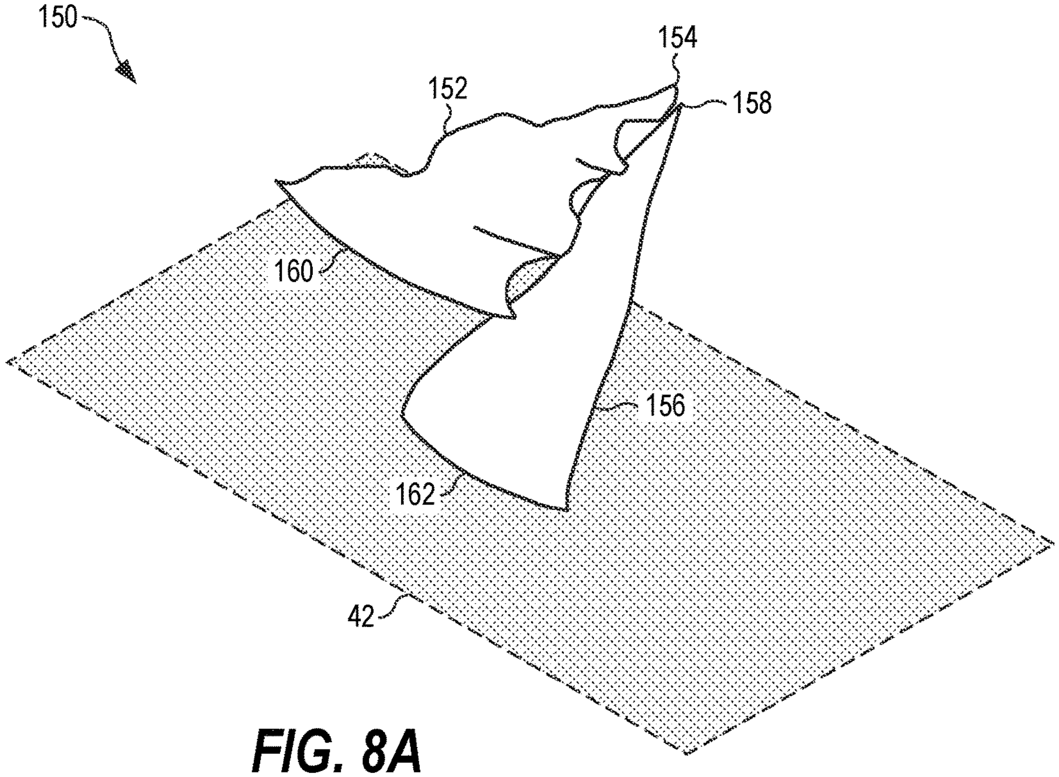
FIGS. 8A and 8B respectively are perspective and side views of a sixth embodiment of an antenna element for use in producing a more consistent horizontally polarized signal that employs a radiator and a counterpoise that each have electrically small deviations from the radiator and counterpoise shown in FIG. 4.
Figure 8B:
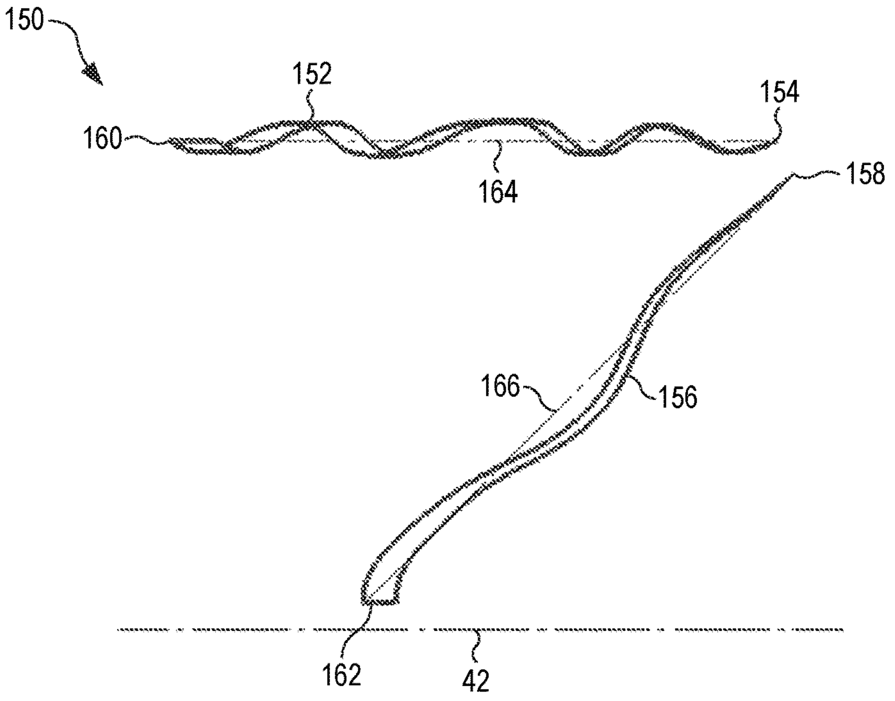

With reference to FIGS. 8A and 8B, a sixth embodiment of an antenna element 150 (hereinafter "element 150") is described. The element 150 includes a radiator 152 and a radiator feed location 154 and a counterpoise 156 with a counterpoise feed location 158. The radiator 152 are the counterpoise 156 are each characterized by having an irregular shape and surfaces. The deviations of the radiator 152 and the counterpoise 156 relative to the corresponding radiator 72 and counterpoise 76 are electrically small. As such, there is little, if any, fundamental difference in the operation of the element 150 relative to element 70. The element 150 has at least one cross section defined by a plane that is perpendicular to the imaginary ground plane 42 and passes through a location that corresponds to location 60 (element 40) and encompasses the radiator feed location 154 and the counterpoise feed location 158 (such as the imaginary plane 58 in FIG. 3) that satisfies the constraints noted with respect to element 40. However, the cross sections used to assess whether these constraints are satisfied are cross sections that are representative of the least squares best fit lines for the radiator 152 and the counterpoise 156, namely, best fit radiator line 164 and best fit counterpoise line 166. More specifically, (a) the best fit radiator line 164 extends from the radiator feed location 154 to whatever terminal end of the best fit radiator line 164 (some point near edge 160) and has a straight-line length of less than $\lambda_I/4$, (b) the best fit counterpoise line 166 extends from the counterpoise feed location 158 to whatever terminal end is defined by the best fit counterpoise line 166 (some point near edge 162) and has a straight-line length of less than $\lambda_I/4$, (c) the best fit counterpoise line is located in a space that extends from the imaginary ground plane 42 up to but not including the best fit radiator line 164, (d) the radiator feed location 154 and the counterpoise feed location 158 can be no more than $\lambda_I/4$ apart, (e) the radiator feed location 154 and the counterpoise feed location 158 are each located closer to the imaginary boundary plane 44 than to the imaginary ground plane 42, and (f) the best fit radiator line 164 and the best fit counterpoise line 166 diverge from a location that corresponds to location 60 in FIG. 3 and encompasses the radiator feed location 154 and the counterpoise feed location 158. Associated with the element 150 is an axis of horizontal polarization radiation, i.e., when in operation, the polarization of the radiated signal can be decomposed into horizontally polarized and vertically polarized component, the horizontally polarized component being parallel to the imaginary ground plane 42 and the vertically polarized component being perpendicular to the imaginary ground 42. In certain embodiments, the radiator 152 is parallel to or lies within the 1magmary boundary plane 44, the separation of the radiator feed location 154 and the counterpoise feed location 156 is no more than $0.05\lambda_I$, the radiator feed location 154 and the counterpoise feed location 158 are located within $0.1\lambda_I$ of the imaginary boundary plane 44, the radiator feed location 154 is intersected by the imaginary boundary plane 44, and the cross-section of the counterpoise 156 is located to have an angle relative to the imaginary ground plane 42 in the range of 30°-90°.

The combination of two or more elements that each satisfy the requirements noted with respect to the element 40 illustrated in FIG. 3 into an antenna structure has a number of advantages relative to a single element that satisfies the requirements noted with respect to the element 40. Namely, the combination of two or more elements into an antenna structure allows for the creation of a radiation signal with an axis of polarization that is not fixed and can be selectively positioned by using appropriate phase and amplitude differences in the signals applied to the antenna.

Figure 9:
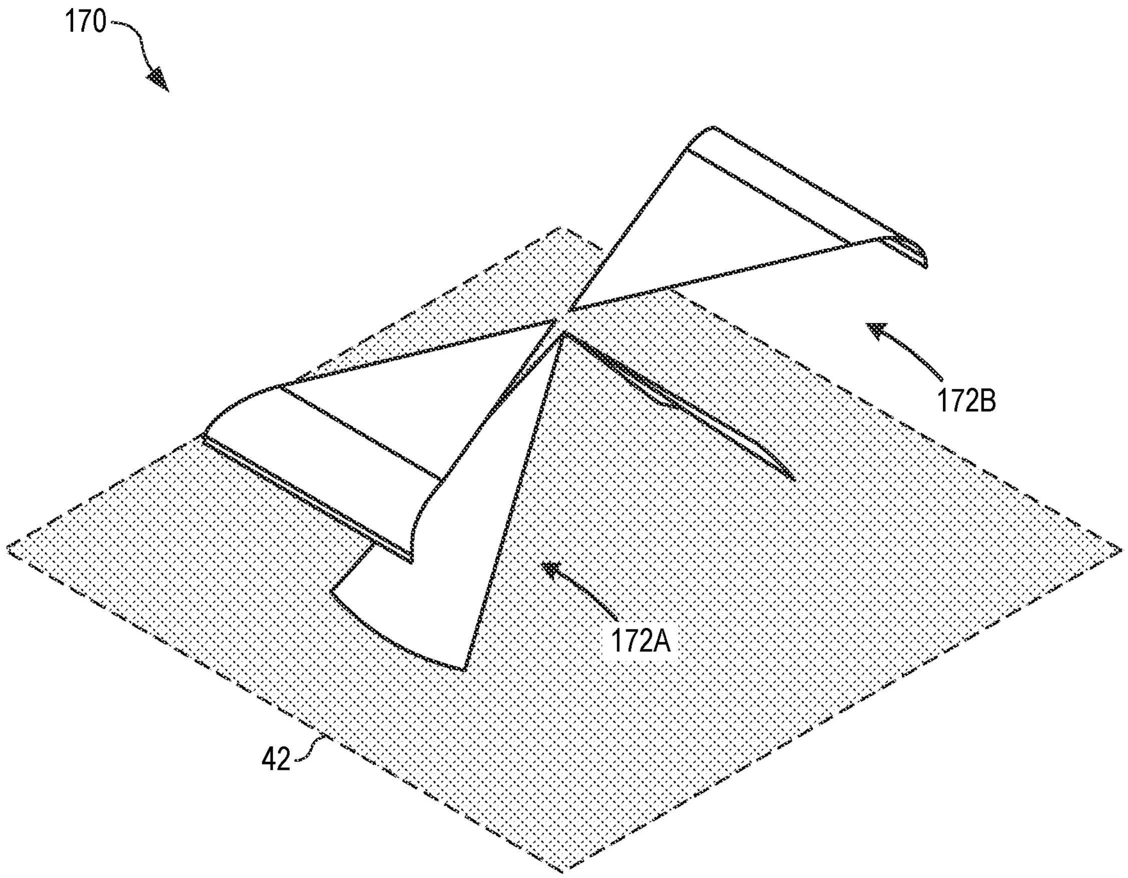
FIG. 9 is a perspective view of a first embodiment of an antenna structure that employs two of the antenna elements shown in FIG. 7.

With reference to FIG. 9, an embodiment of an antenna structure 170 that incorporates two elements 172A, 172B of the type described with respect to FIG. 7. The horizontal polarization axis of element 172A and the horizontal polarization axis of element 172B are aligned. The elements 172A, 172B are aligned in this manner so that the variable polarization that antenna structure 170 is capable of achieving falls within a plane defined by the individual horizontal and vertical components of both of the elements. For example, if the signal applied to element 172A has the same amplitude and phase as the signal applied to the element 172B, the horizontal components of the signals produced by the elements will be substantially canceled and the vertical components of the signals produced by the elements will be substantially combined to produce a signal with a predominantly vertical polarization. As another example, if the signal applied to element 172A has the same amplitude as the signal applied to the element 172B but is 180° out of phase with the signal applied to the element 172B, the horizontal components of the signals produced by the elements will be substantially combined and the vertical components of the signals produced by the elements will be substantially canceled to produce a signal with a predominantly horizontal polarization. The antenna structure 170 can also be used to produce a radiation signal that has both vertical and horizontal polarization components and a selectable ratio of vertical and horizontal component amplitudes by applying a combination of phase and amplitude differences to the elements 172A, 172B. To those skilled in the art, it should further apparent that elliptically/circularly polarized signals in the noted plane can also be achieved with the antenna structure 170. Further, while antenna structure 170 has been described with respect to the use of elements of the kind shown in FIG. 7, it should be appreciated an antenna structure comparable to antenna structure 170 can be achieved with any pair of aligned elements where each element satisfies the requirements noted with respect to element 40. It should also be appreciated that feed locations associated with the element 172A is separated from the feed locations of element 172B by no more than $0.25\lambda_I$.

Figure 10:
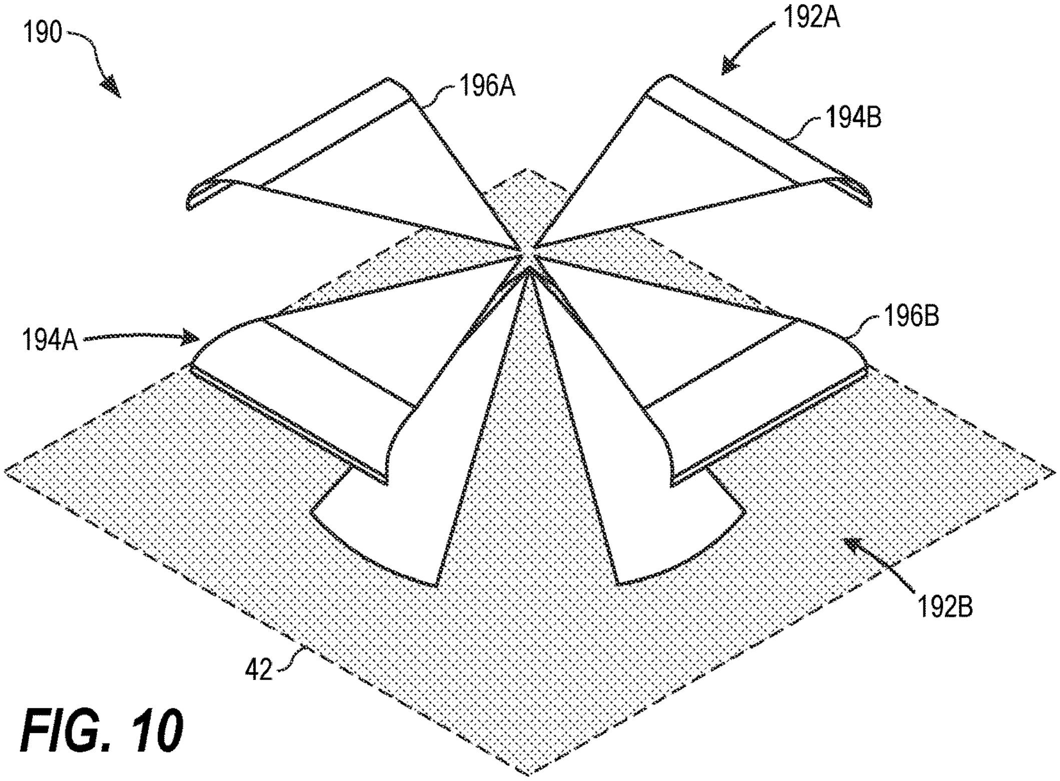
FIG. 10 is a perspective view of a second embodiment of an antenna structure that employs four of the antenna elements shown in FIG. 7.

With reference to FIG. 10, an antenna structure 190 is described that incorporates two pairs of elements, the first pair of elements 192A comprising elements 194A and 194B and the second pair of elements 192B comprising elements 196A and 196B. The horizontal polarization axis of element 194A and the horizontal polarization axis of element 194B are aligned. Likewise, the horizontal polarization axis of element 196A and the horizontal polarization axis of element I 96B are aligned. Further, the aligned horizontal polarization axes of elements 194A, 194B are substantially perpendicular to the aligned horizontal polarization axes of elements 196A, 196B. With antenna structure 190, the following radiation signals can be generated: (a) when the amplitude and the phase of the signal applied to each of the elements 194A, 194B, 196A, 196B are substantially equal, the polarization of the radiation signal that is produced is substantially vertical, (b) when a signal with non-zero amplitude is applied to each of elements 194A, 194B and the signals are equal, a signal with zero amplitude is applied to each of elements 196A, 196B, and the signals applied to elements 194A, 194B have a phase difference of 180°, the resulting signal is a predominantly horizontally polarized with the polarization in the plane defined by the horizontal and vertical signal components of elements 194A, 194B, (c) when a signal with non-zero amplitude is applied to each of elements 196A, 196B and the signals are equal, a signal with zero amplitude is applied to each of elements 194A, 194B, and the signals applied to elements 196A, 196B have a phase difference of 180°, the resulting signal is a predominantly horizontally polarized with the polarization in the plane defined by the horizontal and vertical signal components of elements 196A, 196B, (d) when signals as defined in (b) and are respectively applied to elements 194A, 194B and elements 196A, 196B with varying amplitude ratios of the signals applied to the first pair of elements 192A and the second pair of elements 192B, the resulting signal has predominantly horizontal polarization in a plane perpendicular to the imaginary ground plane 42 with an angle as described in (c) or in (d) or any angle in between, (e) when the signals with a particular relative amplitude and relative phase are applied to elements 194A, 194B of the first pair of elements 192A and the same signals with the same relative amplitude and same relative phase are applied to elements 196A, 196B of the second pair of elements 192B with varying amplitude ratios of the signals applied to the first pair of elements 192A and the second pair of elements 192B, the resulting signal has the same polarization as for each of the first and second pairs of elements 192A, 192B in a plane perpendicular to the imaginary ground plane 42 with an angle as described in (c) or in (d) or any angle in between, and (f) when signals as defined in (b) and (c) are respectively applied to elements 194A, 194B and elements 196A, 196B with equal amplitudes of the signals applied to the first pair of elements 192A and the second pair of elements 192B and the relative phase between the first and second pairs of elements 192A, 192B is 90°, the resulting signal has predominantly circular polarization in a plane parallel to the imaginary ground plane 42. It should also be appreciated that feed locations associated with the first pair of elements 192A is separated from the feed locations of the second pair of element 192B by no more than $0.25\lambda_I$ It should be noted that non-aligned elements, such as elements 214A and 216A, could be used as a two-element pair for polarization variation that is subset of the polarization envelope described with respect to the entire antenna structure 190.

Figure 11:
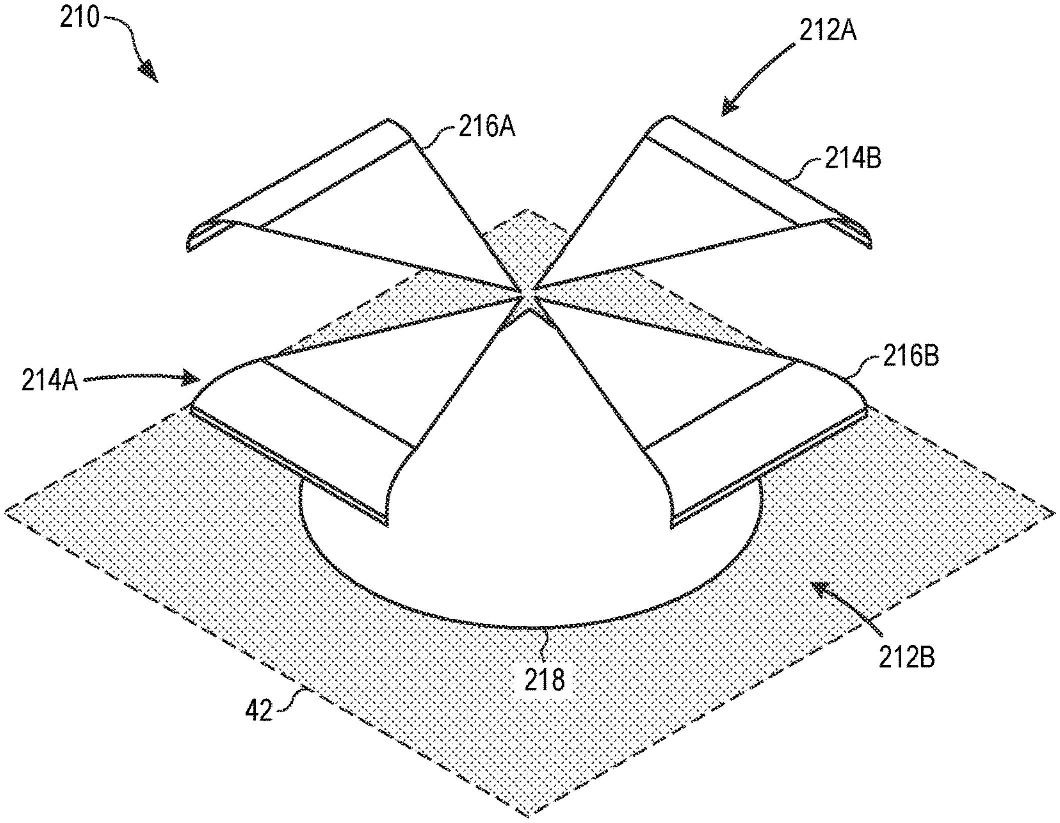
FIG. 11 is a perspective view of a third embodiment of an antenna structure that employs four of the radiator portions of the element shown in FIG. 7 and a single conical counterpoise.

With reference to FIG. 11, an antenna structure 210 is described that incorporates two pairs of elements 212A and 212B, the first pair of elements 212A comprising elements 214A and 214B and the second pair of elements 212B comprising elements 216A and 216B. Unlike the antenna structure 190, the individual counterpoises associated with each of the radiators have been merged into a single counterpoise structure 218 in the shape of a cone. The antenna structure 210 is capable of generating all of the radiation signals described with respect to antenna structure 190. It should also be appreciated that feed locations associated with the first pair of elements 212A is separated from the feed locations of the second pair of element 212B by no more than 0.25λ.

Figure 12A:
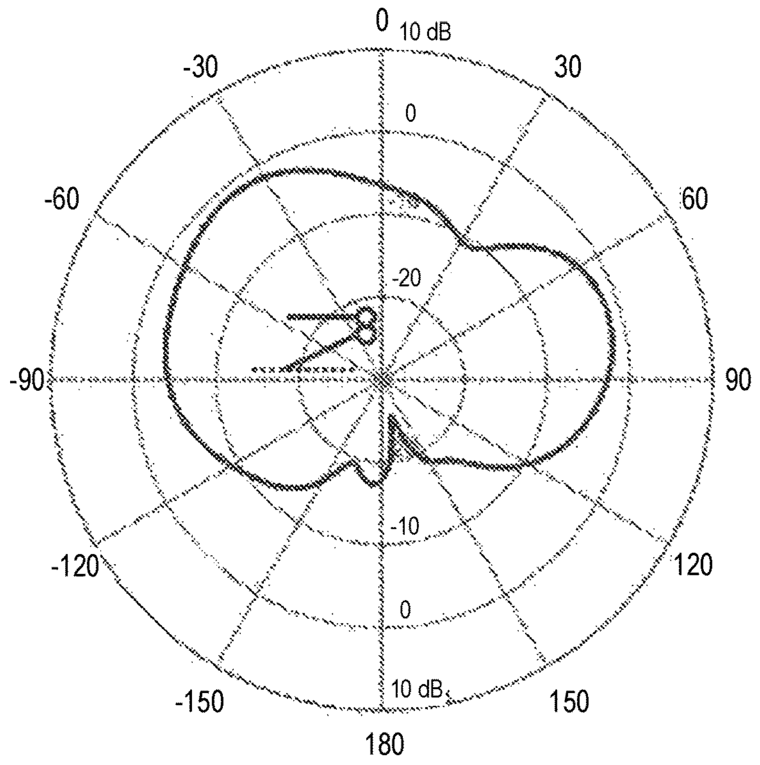
FIGS. 12A and 12B respectively illustrate first and second elevational cut radiation patterns for the element shown in FIG. 7 when facing in opposite directions.
Figure 12B:
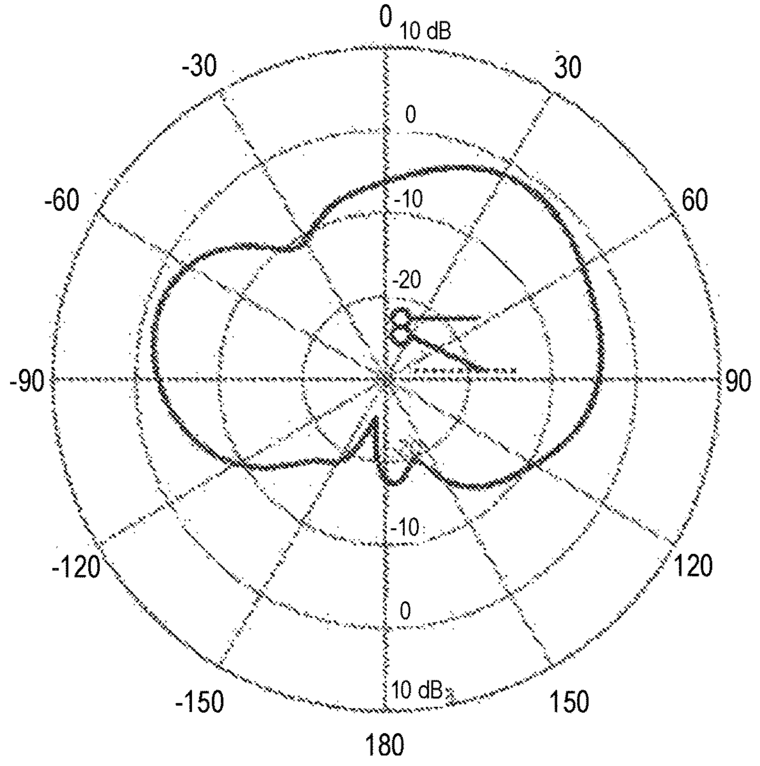

FIGS. 12A and 12B respectively are examples of the patterns of element 40 for linear polarization in the plane defined by the vertical and horizontal components of element 40 in a first direction and a second diametrically opposite direction.

Figure 13:
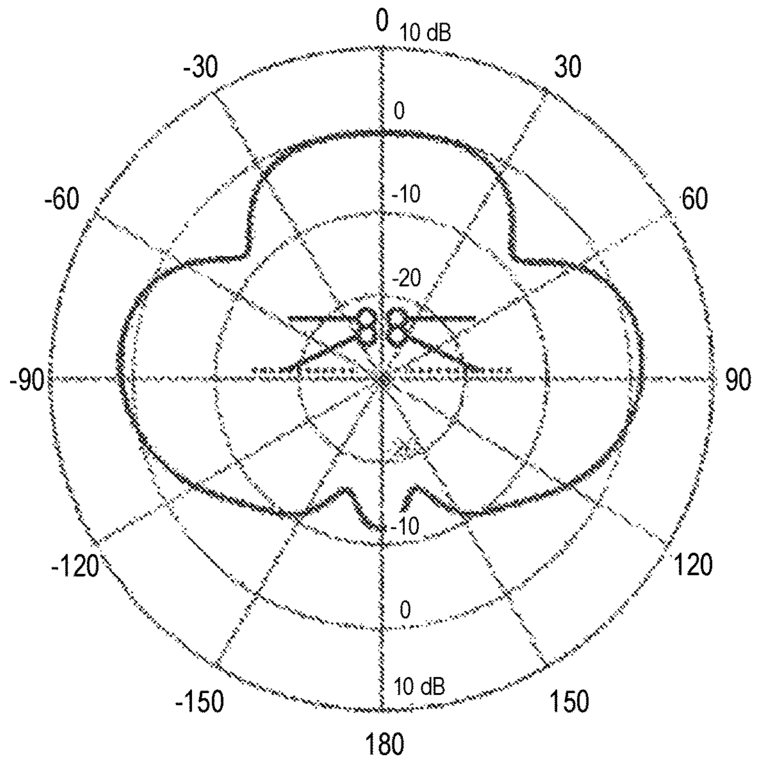
FIG. 13 illustrates an elevational cut radiation pattern for the antenna structure shown in FIG. 9 with signals applied to the two elements that differ by a 180° to favor the horizontal polarization.

With reference to FIG. 13, the vertical polarization pattern in the elevation plane for antenna structure 170 is shown. Notably, this pattern is an additive combination or superimposition of the patterns shown in FIGS. 12A and 12B. More specifically, this pattern result from the application of a signal to element 172A that has the same amplitude as the signal applied to the element 172B but is 180° out of phase with the signal applied to the element 172B. In this case, the horizontal components of the signals produced by the elements will be substantially combined and the vertical components of the signals produced by the elements will be substantially canceled to produce a signal with a predominantly horizontal polarization in the noted plane.

Figure 14:
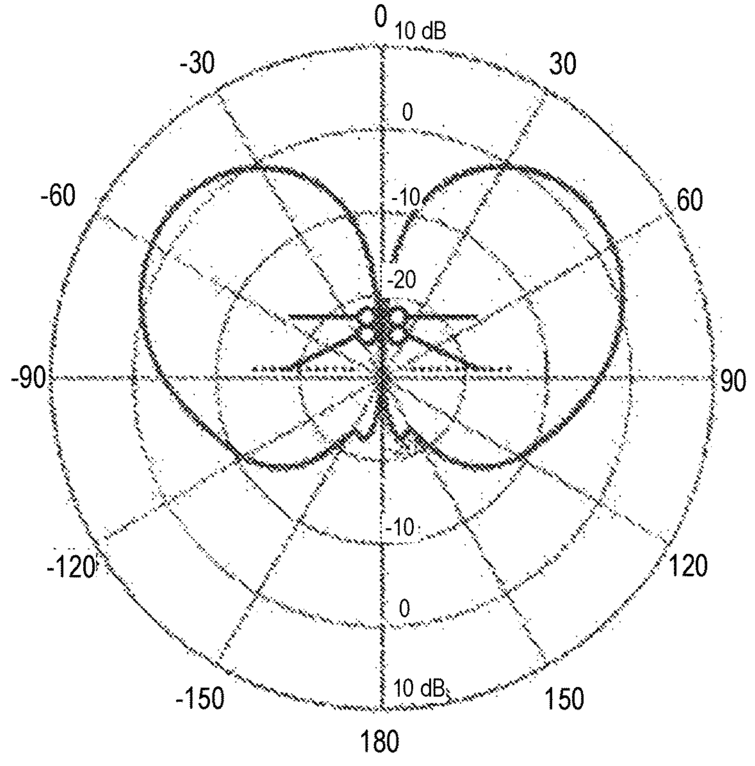
FIG. 14 illustrates an elevational cut radiation pattern for the antenna structure shown in FIG. 9 with signals applied to the two elements that differ by a 0° to favor the vertical polarization.

With reference to FIG. 14, the vertical polarization pattern in the elevation plane for antenna structure 170 is shown. Notably, this pattern is a subtractive combination of the patterns shown in FIGS. 12A and 12B. More specifically, this pattern result from the application of a signal to element 172A that has the same amplitude as the signal applied to the element 172B but in phase with the signal applied to the element 172B. In this case, the vertical components of the signals produced by the elements will be substantially combined and the horizontal components of the signals produced by the elements will be substantially canceled to produce a signal with a predominantly vertical polarization in the noted plane.

Figure 15:
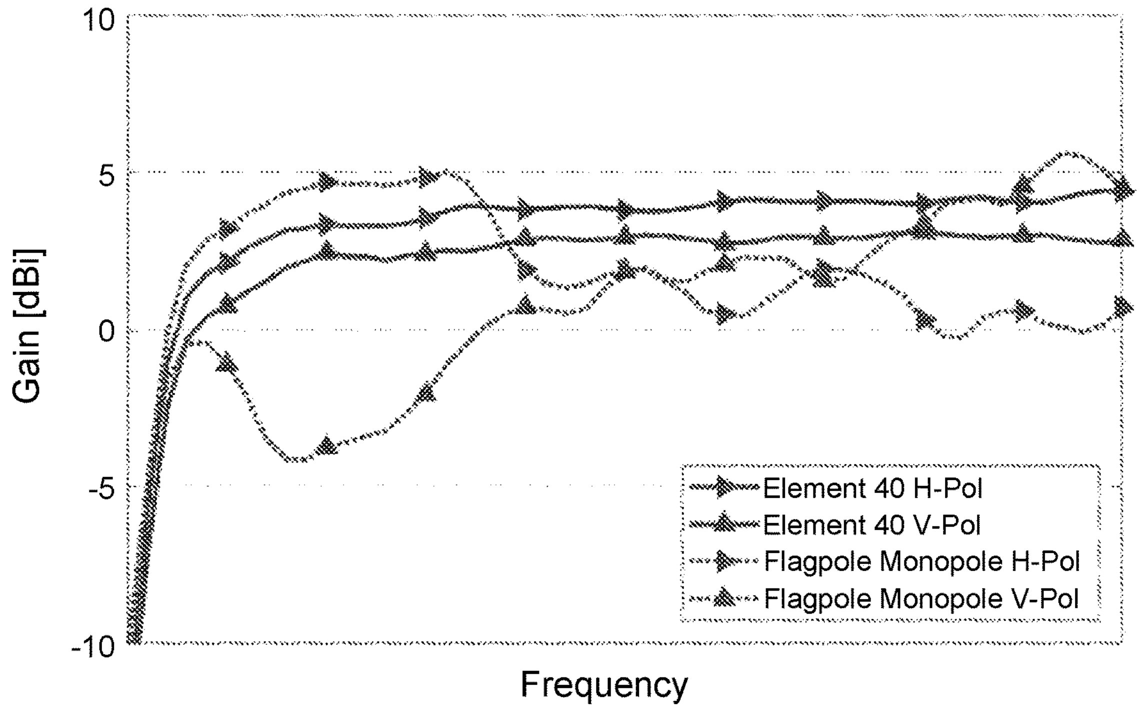
FIG. 15 illustrates the gain versus frequency for a flagpole monopole compared to the element shown in FIG. 3.

With reference to FIG. 15, the horizontal polarization components of element 40 are compared the same polarization components of a flagpole monopole. This comparison shows that the polarization components of the element 40 are more consistently polarized signal over frequency (i.e., have a more consistent ratio of one to the other) than the polarization components of the flagpole monopole, as particularly shown by the large and varying spacing between the polarization components, as well as the inversion of the ratio of the components, of the flagpole monopole.

Figure 16:
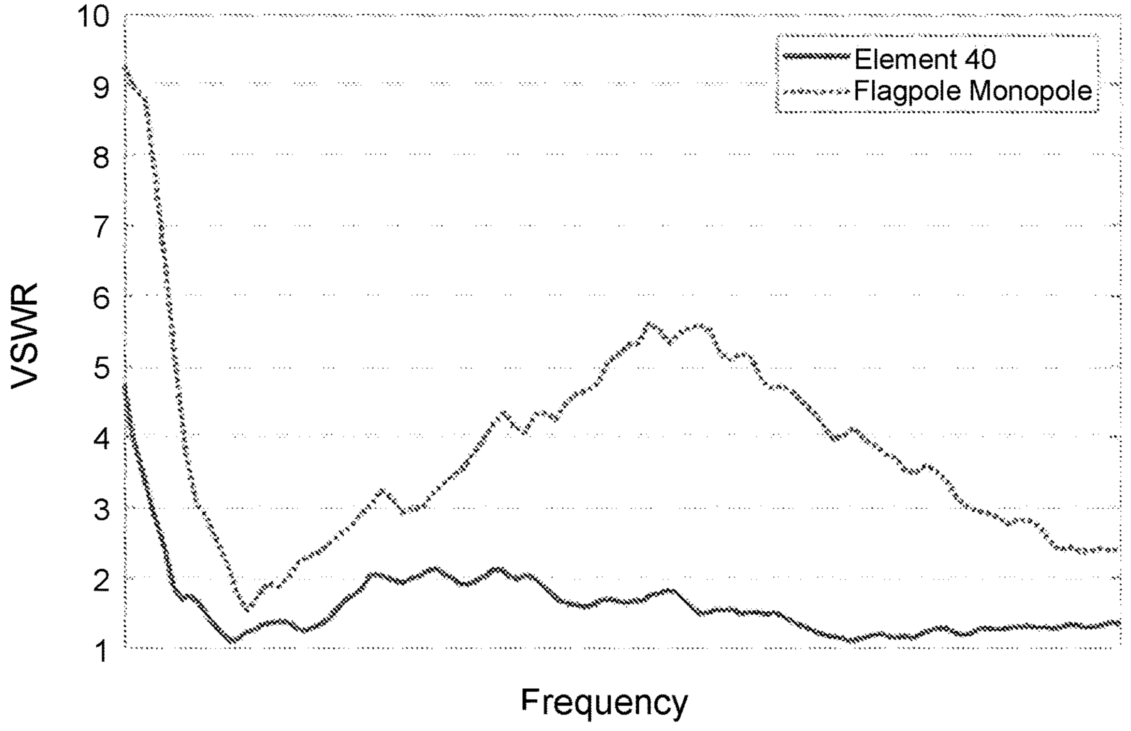
FIG. 16 illustrates the VSWR versus frequency for a flagpole monopole compared to the element shown in FIG. 3.

With reference to FIG. 16, the VSWR for element 40 is compared to the VSWR for the flagpole monopole. This comparison shows that the low-end frequency of element 40 is superior to that of the flagpole monopole. In addition, the overall bandwidth of the element 40 at a VSWR of less than 3:1 is superior to that of the flagpole monopole.

Antenna Arrays

Figure 17:
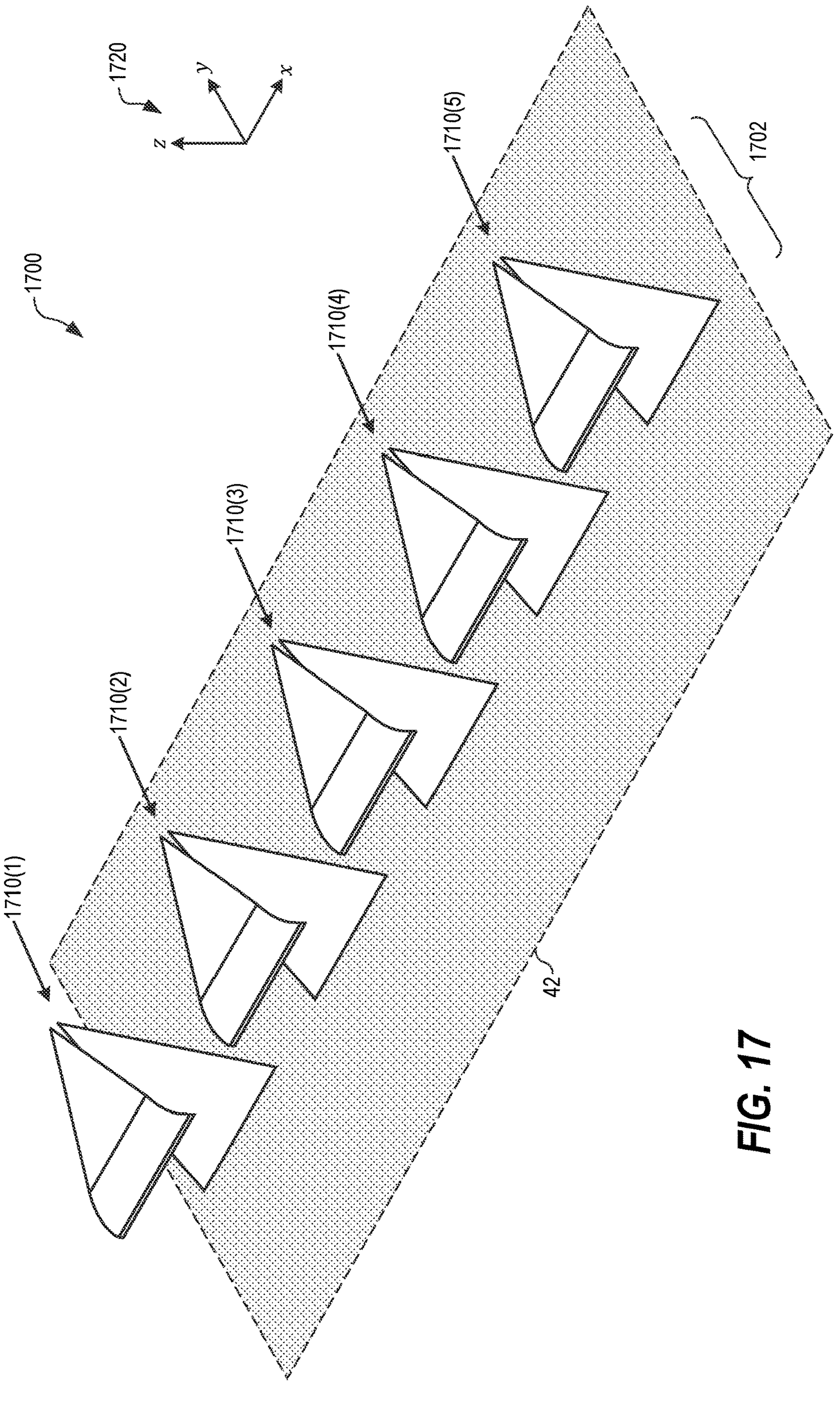
FIG. 17 is a perspective view of an antenna system that includes a plurality of antenna elements arranged into an antenna array extending linearly along a first direction, in embodiments.

FIG. 17 is a perspective view of an antenna system 1700 that includes a plurality of antenna elements 1710 arranged into an antenna array 1702 extending linearly along a first direction. In the example of FIG. 17, the first direction is parallel to the x axis of a right-handed coordinate system 1720. The antenna array 1702 is shown in FIG. 17 with five antenna elements 1710. However, the antenna array 1702 may have any number of two or more antenna elements 1710. The antenna elements 1710 may be positioned such that phase centers of neighboring antenna elements 1710 are separated, along x, by a spacing of λ/2. However, the antenna elements 1710 may be separated by a different spacing (e.g., 3λ/2, 5λ/2, etc.). Furthermore, it is not necessary that the antenna elements 1710 be uniformly spaced along x. Thus, in one embodiment, pairs of neighboring antenna elements 1710 are separated by various spacings.

In FIG. 17, each antenna element 1710 is shown as the antenna element 110 of FIG. 6. However, the antenna array 1702 may be formed from any antenna element of the present embodiments (e.g., antenna elements 70, 90, 130, 150, etc.). In one embodiment, all of the antenna elements 1710 are of the same type, as shown in FIG. 17. However, in other embodiments, the antenna array 1702 includes two or more different types of antenna elements 1710.

The antenna elements 1710 are shown in FIG. 17 with the same orientation. Here, the orientation of an antenna element 1710 refers to its angle about a rotation axis that is perpendicular to the first direction. For example, in FIG. 17 each antenna element 1710 is oriented with its radiation feed location 114 and counterpoise feed location 118 located in the +y direction while its distal edges 120 and 122 are located in the −y direction. Thus, in this example, the orientation indicates the rotation of the antenna element 1710 about the z axis. In other embodiments, the antenna elements 1710 have different orientations. For example, the antenna elements 1710 can alternate between two orientations that differ by a 180° rotation. As another example, the antenna elements 1710 can cycle between four orientations, each differing from its neighbor by a 90° rotation.

In some embodiments, the antenna system 1700 includes a ground plane 42 that is located underneath the antenna array 1702. The ground plane 42 is parallel to the first direction and perpendicularly displaced from the first direction along a third direction (i.e., the −z direction in FIG. 17). The ground plane 42 extends along the first direction and a second direction that is perpendicular to the first and third directions. The ground plane 42 is "underneath" the antenna array 1702 in that the ground plane 42 is closer to the counterpoises of the antenna elements 1710, as compared to their radiators. In one embodiment, the ground plane 42 is at least partially located underneath each antenna element 1710. In another embodiment, the ground plane 42 extends sufficiently in the first and third directions that it is located fully underneath all of the antenna elements 1710. In some embodiments, the antenna system 1700 excludes the ground plane 42. In these embodiments, the ground plane may be provided by a third party.

Figure 18:
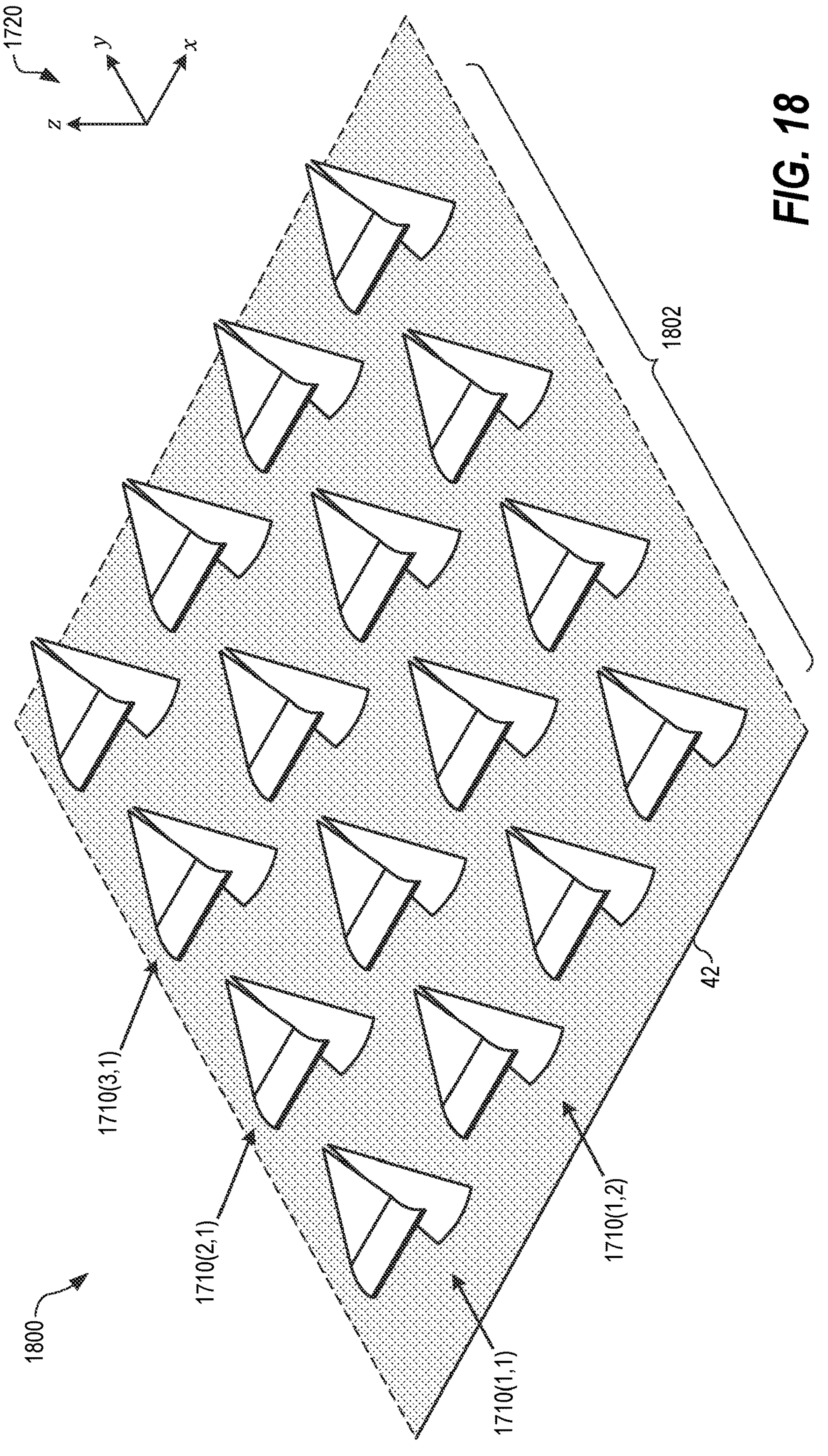
FIG. 18 is a perspective view of an antenna system that is similar to the antenna system of FIG. 17 except that the antenna elements form a two-dimensional antenna array that extends along first and second directions, in embodiments.

FIG. 18 is a perspective view of an antenna system 1800 that is similar to the antenna system 1700 of FIG. 17 except that the antenna elements 1710 form a two-dimensional antenna array 1802 that extends along first and second directions. In FIG. 18, the first and second directions are orthogonal, and therefore the antenna array 1802 is rectilinear. In this case, each antenna element 1710(*i*, *j*) is labeled with a row index i and a column index j. However, the first and second directions need not be orthogonal. Accordingly, the antenna elements 1710 can form another type of two-dimensional array, such as a triangular array or hexagonal array. In other embodiments, the antenna elements 1710 are arranged linearly along a line that curves in the first and second directions. For example, the antenna elements 1710 may form a circular array or arc.

Figure 19:
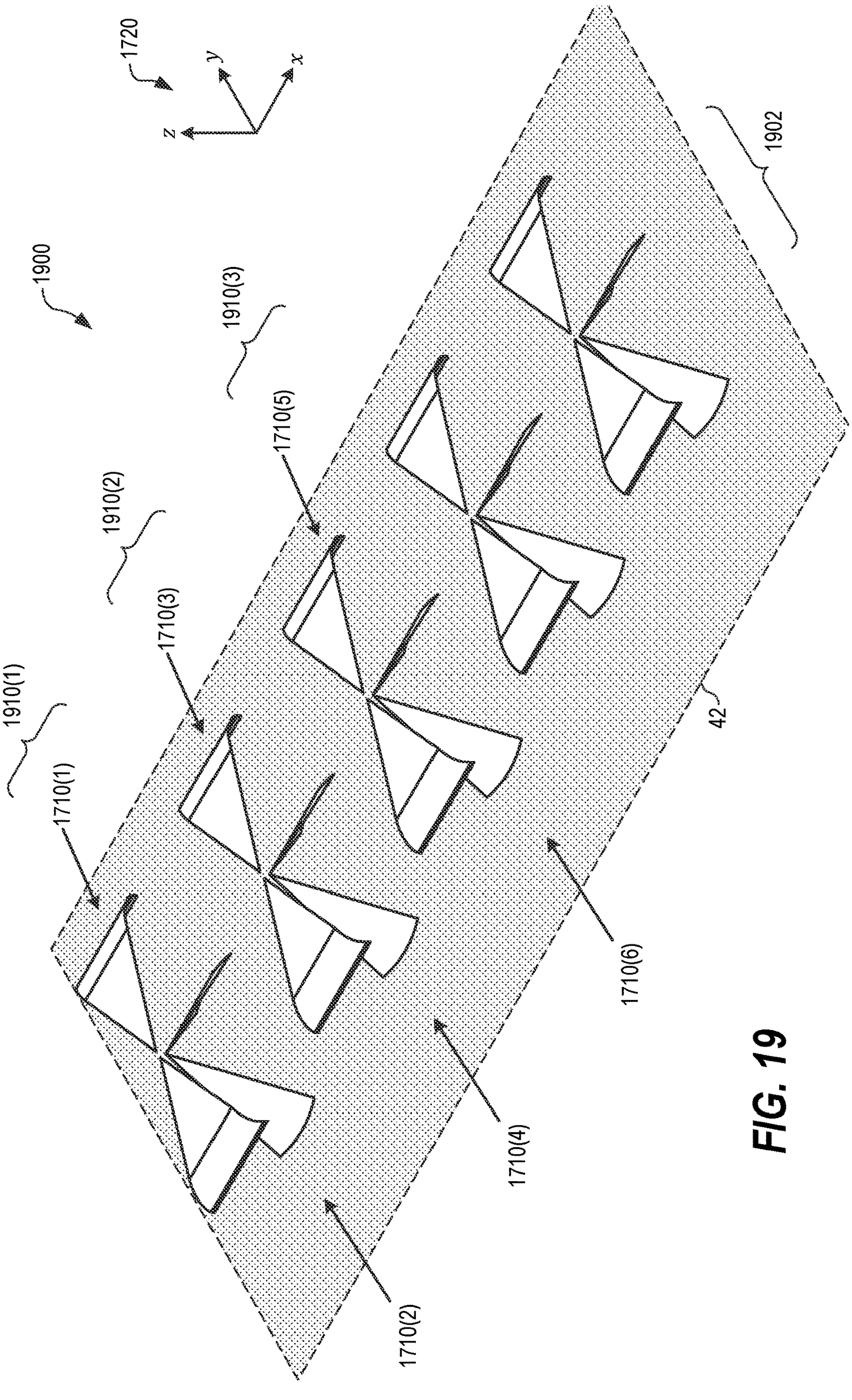
FIG. 19 is a perspective view of an antenna system that is similar to the antenna system of FIG. 17 except that the antenna elements form an antenna array in which each array element is a pair of the antenna elements, in embodiments.

FIG. 19 is a perspective view of an antenna system 1900 that is similar to the antenna system 1700 of FIG. 17 except that the antenna elements 1710 form an antenna array 1902 in which each array element 1910 is a pair of the antenna elements 1710. For example, a first antenna element 1710(1) and a second antenna element 1710(2) cooperatively form a first array element 1910(1). Similarly, a third antenna element 1710(3) and a fourth antenna element 1710(4) cooperatively form a second array element 1910(2), a fifth antenna element 1710(5) and a sixth antenna element 1710(6) cooperatively form a third array element 1910(3), and so on. While FIG. 19 shows the antenna array 1902 having five array elements 1910, the antenna array 1902 may have any number of two or more array elements 1910.

In FIG. 19, each array element 1910 is shown as the antenna structure 170 of FIG. 9. However, each array element 1910 may be a different type of two-radiator antenna structure of the present embodiments. Similar to the antenna array 1702 of FIG. 17, the array elements 1910 need not be uniformly spaced and need not all have the same orientation. While FIG. 19 shows the antenna array 1902 extending linearly in one direction, the antenna array 1902 may extend in two directions, like the antenna array 1802 of FIG. 18.

Figure 20:
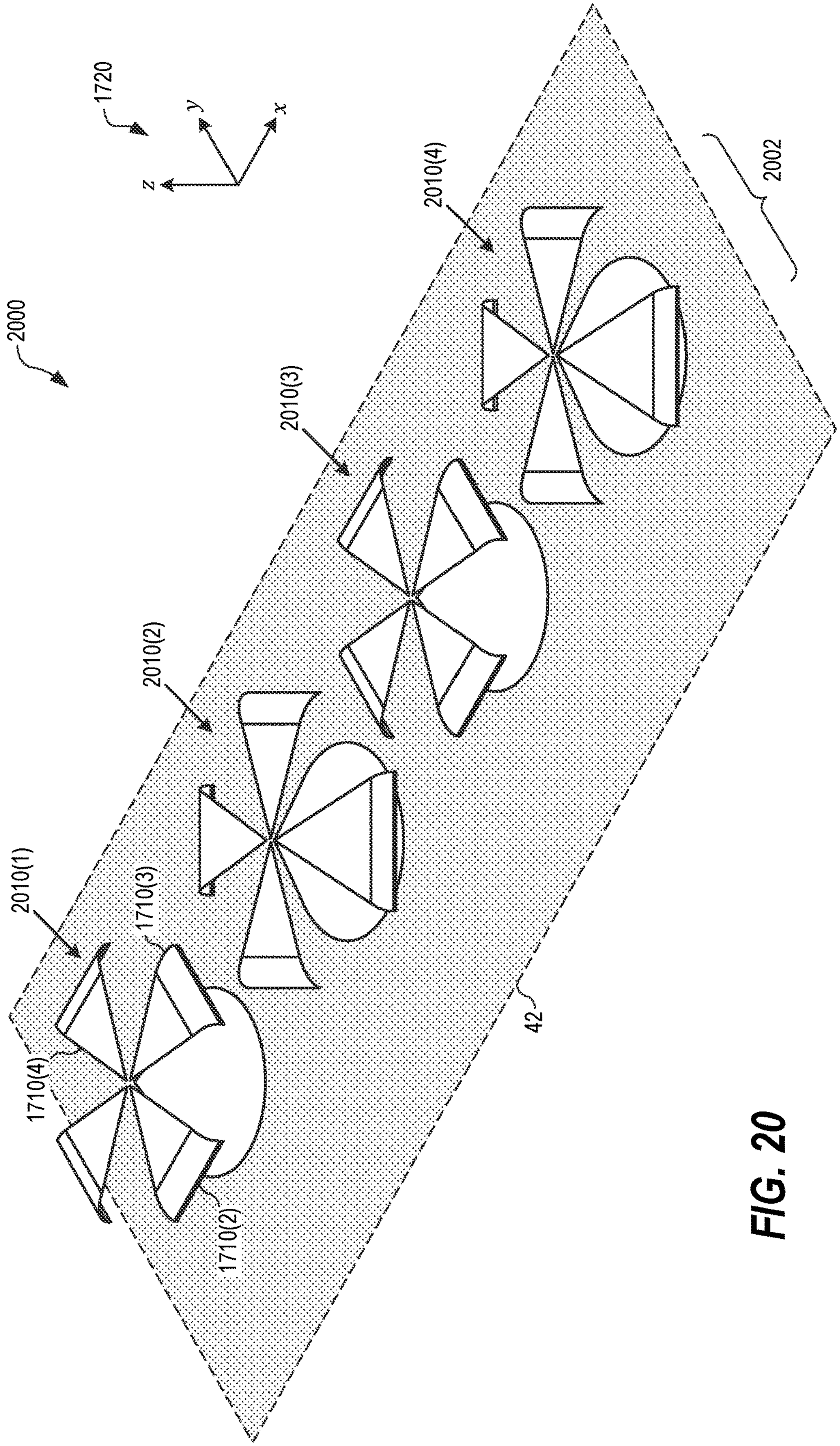
FIG. 20 is a perspective view of an antenna system that is similar to the antenna system of FIG. 17 except the antenna elements form an antenna array in which each array element has four of the antenna elements, in embodiments.

FIG. 20 is a perspective view of an antenna system 2000 that is similar to the antenna system 1700 of FIG. 17 except the antenna elements 1710 form an antenna array 2002 in which each array element 2010 has four of the antenna elements 1710. Specifically, a first array element 2010 is formed from a first antenna element 1710(1), a second antenna element 1710(2), a third antenna element 1710(3), and a fourth antenna element 1710(4). While FIG. 20 shows the antenna array 2002 having four array elements 2010, the antenna array 2002 may have any number of two or more array elements 2010.

In FIG. 20, each array element 2010 is shown as the antenna structure 210 of FIG. 11. However, each array element 2010 may be a different type of four-radiator antenna structure of the present embodiments (e.g., the antenna structure 190 of FIG. 10). Similar to the antenna array 1702 of FIG. 17, the array elements 1910 need not be uniformly spaced. While FIG. 20 shows the antenna array 2002 extending linearly in one direction, the antenna array 2002 may alternatively extend in two directions, like the antenna array 1802 of FIG. 18.

FIG. 20 shows how the orientation of the array elements 2010 does not need to be the identical throughout the antenna array 2002. Rather, the array elements 2010 can be partitioned into at least a first set having a first orientation and a second set having a second orientation that is different from the first orientation. For example, in FIG. 20, the first antenna element 2010(1) and third antenna element 2010(3) are oriented with their radiators aligned along the x and y axes while the second antenna element 2010(2) and fourth antenna element 2010(4) are rotated, in the x-y plane, at 45° relative to the antenna elements 2010(1) and 2010(3).

In other embodiments, a multi-radiator antenna structure is similar to the two-element antenna structure 170 of FIG. 9 and the four-element antenna structure 190 of FIG. 10 except that it has any integer number of two or more radiators (e.g., 3, 5, 6, 12, 16, 48, etc.). The radiators may be arranged circumferentially around a common point, either uniformly and non-uniformly. Like the antenna structure 210 of FIG. 11, the radiators may share a single counterpoise structure. The single counterpoise structure may be shaped as a cone, as shown in FIGS. 11 and 20. Alternatively, the single counterpoise structure may have a different shape, such as a conical frustrum, pyramid, or pyramidal frustrum.

In embodiments, an antenna system includes an antenna array having a plurality of array elements. Each array element is the multi-radiator antenna structure described above. In one embodiment, all of the multi-radiator antenna structures have the same number of radiators. In another embodiment, the array elements have various numbers of radiators. In some embodiments, all of the multi-radiator antenna structures have the same size, shape, and orientation. However, in other embodiments, the multi-radiator antenna structures have various sizes, shapes, orientations, or any combination thereof. The antenna array may be a one-dimensional array, similar to the antenna arrays 1902 and 2002 described above. Alternatively, the antenna array may be a two-dimensional array, similar to the antenna array 1802.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. An antenna system comprising:

a plurality of antenna elements arranged in an array having a plurality of array elements, each antenna element of the plurality of antenna elements comprising:

a radiator extending from a radiator feed end to a radiator terminal end, a first straight-line distance from the radiator feed end to the radiator terminal end being less than $\lambda/4$, where $\lambda$ is a longest wavelength of a bandwidth of said each antenna element; and a counterpoise extending from a counterpoise feed end to a counterpoise terminal end, a second straight-line distance from the counterpoise feed end to the counterpoise terminal end being less than $\lambda/4$;

wherein (i) the counterpoise feed end is spaced apart from the radiator feed end and (ii) the radiator and the counterpoise diverge at an acute angle from an area encompassing the radiator feed end and the counterpoise feed end.

2. The antenna system of claim 1, further comprising a ground plane that extends at least partially underneath each antenna element;

wherein (i) the radiator is characterized by a best-fit radiator line and (ii) a maximum distance from the best-fit radiator line to the counterpoise, along a normal direction that is both toward the ground plane and perpendicular to the ground plane, is less than $\lambda/2$.

3. The antenna system of claim 2, wherein for each antenna element, the radiator feed end and the counterpoise feed end are each located at least $\lambda/4$, in the normal direction, from the ground plane.

4. The antenna system of claim 1, the radiator feed end being spaced from the counterpoise feed end by less than $\lambda/4$.

5. The antenna system of claim 1, the radiator including a planar section and a curved section distal from the radiator feed end.

6. The antenna system of claim 1, wherein the plurality of array elements are spaced along a first direction to form a one-dimensional array.

7. The antenna system of claim 1, wherein the plurality of array elements are spaced along two orthogonal directions to form a two-dimensional array.

8. The antenna system of claim 1, wherein the plurality of array elements are uniformly spaced.

9. The antenna system of claim 1, wherein all of the plurality of array elements have the same orientation.

10. The antenna system of claim 1, wherein each of the plurality of array elements comprises one of the plurality of antenna elements.

11. The antenna system of claim 1, wherein each of the plurality of array elements comprises a pair of the plurality of antenna elements.

12. The antenna system of claim 11, wherein:

the array extends along a first direction; and the pair exhibits mirror symmetry about the first direction.

13. The antenna system of claim 1, wherein each of the plurality of array elements comprises first, second, third, and fourth antenna elements of the plurality of antenna elements.

14. The antenna system of claim 13, wherein:

the first antenna element has a first horizontal polarization axis;

the second antenna element has a second horizontal polarization axis that is aligned with the first horizontal polarization axis;

the third antenna element has a third horizontal polarization axis;

the fourth antenna element has a fourth horizontal polarization axis that is aligned with the third horizontal polarization axis; and the first and second horizontal polarization axes are both not aligned and not parallel to the third and fourth horizontal polarization axes.

15. The antenna system of claim 13, wherein, for each of the plurality of array elements, the first, second, third, and fourth antenna elements share a counterpoise structure.

16. The antenna system of claim 15, the counterpoise structure being at least partly shaped as a cone or conical frustrum.

17. The antenna system of claim 16, wherein the first, second, third, and fourth antenna elements are located circumferentially around the counterpoise structure.

18. The antenna system of claim 13, wherein all of the plurality of array elements have the same orientation.

19. The antenna system of claim 13, wherein:

all of a first subset of the plurality of array elements have the same first orientation;

all of a second subset of the plurality of array elements have the same second orientation; and the second orientation is different from the first orientation.

20. The antenna system of claim 19, wherein the second orientation is rotated 45° with respect to the first orientation.

* * * * *